(12) United States Patent
Matthews

(10) Patent No.: US 6,516,563 B1
(45) Date of Patent: Feb. 11, 2003

(54) PLANT CONTAINER

(76) Inventor: Philip Lindsay Matthews, P.O. Box 47, Kooringal NSW 2650 (AU)

( * ) Notice: Subject to any disclaimer, the term of this patent is extended or adjusted under 35 U.S.C. 154(b) by 0 days.

(21) Appl. No.: 09/831,027

(22) PCT Filed: Nov. 5, 1999

(86) PCT No.: PCT/AU99/00977
§ 371 (c)(1),
(2), (4) Date: Aug. 13, 2001

(87) PCT Pub. No.: WO00/27181
PCT Pub. Date: May 18, 2000

(30) Foreign Application Priority Data

Nov. 6, 1998 (AU) ............................................. PP 6985

(51) Int. Cl.[7] ................................................ A01G 9/02
(52) U.S. Cl. ............................... 47/66.1; 47/79; 47/83; 47/86; 47/85
(58) Field of Search ...................... 47/39, 41.14, 32.4, 47/79, 48.5, 75, 82, 83, 86, 85, 68, 65, 65.5, 65.9, 66.1, 66.4, 66.6

(56) References Cited

U.S. PATENT DOCUMENTS

| | | | | |
|---|---|---|---|---|
| 608,590 A | * | 8/1898 | Freund | |
| 2,803,923 A | * | 8/1957 | Pratt | |
| 3,961,443 A | * | 6/1976 | Insalaco | 47/32 |
| 4,145,841 A | * | 3/1979 | Woolpart | 47/66 |
| 4,334,387 A | * | 6/1982 | Karpisek | 47/83 |
| 4,949,486 A | * | 8/1990 | Belokin et al. | 40/414 |
| 4,986,025 A | * | 1/1991 | Imperial | 47/2 |
| D353,435 S | * | 12/1994 | Bartley | D8/1 |
| 5,404,672 A | * | 4/1995 | Sanderson | 47/82 |
| 5,509,232 A | * | 4/1996 | Laubsch | 47/79 |
| 6,202,349 B1 | * | 3/2001 | Kanagawa | |
| 6,223,466 B1 | * | 5/2001 | Billings | 47/79 |

FOREIGN PATENT DOCUMENTS

| | | | | |
|---|---|---|---|---|
| EP | 0098474 | * | 6/1983 | A01G/9/00 |
| FR | 2146516 | * | 5/1973 | A01G/9/00 |
| WO | WO 98/02032 | * | 1/1998 | A01G/13/02 |

* cited by examiner

Primary Examiner—Peter M. Poon
Assistant Examiner—Andrea Valenti
(74) Attorney, Agent, or Firm—Foley & Lardner

(57) ABSTRACT

A plant container (22) formed of two readily releasable half-container parts (32), each part having a plant container portion (38). The two parts combine to define therebetween an opening (28) adapted to permit access of any plant growth (16) extending from beneath the plant container (22). The plant container (22) is adapted to be located adjacent the upper portion of a conventional plant hire container arrangement of an outer decorative container (4) housing an inner plant container (6).

10 Claims, 4 Drawing Sheets

PLANT CONTAINER

TECHNICAL FIELD

This invention relates to plant containers, plant pots, plant boxes and the like. The invention relates, in particular, to indoor container arrangements for plants, shrubs, trees which have a substantially vertical growth, stem, trunk or the like. However, the invention is also applicable to outdoor plant containers and to any plant container having a plant therein and having an area of the growing medium upper surface which is generally free of plant growth.

BACKGROUND ART

Indoor container arrangements for plants, shrubs, trees and the like are well known. The arrangements typically include an outer decorative container and a smaller inner plant container. The decorative outer container is designed to prevent damage to the indoor floor or floor covering, and the external surface of the outer container is usually designed to appeal to the eye or to blend in with the surrounding indoor furniture. The inner plant container houses the plant, is spaced from the inner walls of the outer container, and is usually of lesser height than the outer container. The space on top of the plant container arrangement surrounding the plant stem(s)/ growth and generally adjacent the upper periphery of the outer container is layered with coconut fibre. Thus the inner plant container is not normally visible to the observer. To water or feed the plant the coconut fibre is pulled aside or lifted, the plant in the inner container is fed and the coconut fibre re-positioned. The above arrangement is very common and has been used for many years, particularly in the plant hire industry.

It is an object of the invention to provide a useful alternative to plant container arrangements known to the applicant.

SUMMARY OF INVENTION

In one aspect this invention resides broadly in a plant container assembly for positioning within an outer container, the assembly including:

a lower container adapted to house plant(s) and a planting medium;

upper container means adapted to house plant(s) and positionable above the lower container adjacent the upper inner portion of the outer container;

support means for supporting the upper container means on the lower container and/or the upper portion of the outer container;

access means to provide access for a plant growth, stem, trunk or the like extending from the lower container, and reservoir means for containing water and/or nutrient for a plant(s) growing in the upper container mean;

whereby in use the upper container means substantially conceals the lower container and planting medium therein.

It is preferred that the container means includes a plurality of container segments adapted to cooperate to substantially cover the inner upper periphery of the outer container and to define an aperture constituting the access means.

It is also preferred that the plant container assembly includes reservoir means for containing water and/or nutrient for a plant(s) growing in the upper container means, the reservoir means defining with the base of the upper container means a shoulder constituting the support means, the shoulder being adapted to support the upper container means on an upper surface of the lower container.

In another aspect this invention resides broadly in a method of substantially concealing a lower container and planting medium therein positioned within an outer container, the method including:

positioning above the lower container adjacent the upper inner portion of the outer container, upper container means adapted to house plant(s);

the upper container including support means for supporting the upper container means on the lower container and/or the upper portion of the outer container, and access means to provide access for a plant growth, stem, trunk or the like extending from the lower container.

In another aspect this invention resides broadly in a plant container assembly for substantially covering the periphery of a lower outer container housing at least one lower inner container, the lower inner container(s) being adapted to house plant(s), the assembly including:

container means adapted to house plant(s) and adapted to be located above the inner container(s) and located adjacent the upper portion of the outer container;

support means for supporting the assembly on the inner container(s) and/or the upper portion of the outer container, and access means to provide access for a plant growth, stem, trunk or the like extending from the lower inner plant container(s).

The invention in another aspect resides in a plant container assembly including:

a lower outer container;

the lower outer container housing at least one lower inner container;

the lower inner container(s) being adapted to house plant (s), an upper container adapted to house plant(s) and adapted to be located above the inner container(s) and located adjacent the upper portion of the outer container; and the upper container means being provided with access means to provide access for a plant growth, stem, trunk or the like extending from the lower inner plant container(s).

A choice of plants may be placed in the upper container to provide an enhanced or alternative appearance when compared with the coconut fibre and the like prior art. The upper container need not necessarily include plants, it could contain a variety of materials, such as for example, wood chips or stones. The upper container could be periodically exchanged with a container of new/different plants/contents as desired.

The container is preferably adapted to cooperate with standard size plant pots/containers but may be of any suitable size or shape and may be formed of any suitable material. Preferably the upper periphery of the plant container generally conforms to the upper peripheral shape of the lower outer container so that the lower inner container is not normally visible to the observer.

Any suitable form of access means may be provided in the upper plant container to permit access of plants growing from the lower container. The access means is preferably in the form of an opening or openings provided in the upper container. Alternatively, the outer and upper containers could cooperate to define the opening(s). The size, shape and number of openings would depend upon the nature of the plant growth in the lower container(s). In the case where a single lower inner container has a plant having a single central stem or trunk then a single opening could be provided centrally in the upper plant container.

To facilitate installation, removal or exchange the upper container is preferably readily releasable from the plant container assembly. Thus the upper container is preferably readily releasable from the outer container, the inner plant container and/or the plant trunk, growth or the like.

Any suitable means may be provided to readily release the upper container. For this purpose the upper container is preferably formed of a plurality of container parts. In a preferred arrangement, the upper container could be formed of two readily releasable parts, each part having a plant container portion, and the two parts combine to define therebetween an opening adapted to permit access of any plant growth extending from beneath the upper plant container. The two half containers could be readily lifted and laterally separated when it is desired to gain access to the lower container or to remove or exchange the upper container.

The upper container may be formed with collapsible side walls so as to extend in concertina-fashion to form a ruff-like annulus about and within the top of the outer container.

The upper container may be provided with liquid storage means, such as a water well for feeding plants in the upper container. In one arrangement the upper container is provided with an upper housing for housing the plant growth medium and a communicating lower housing acting as the water well, whereby the well is located generally below the plant roots. Preferably the upper plant growth housing is in the form of a peripheral channel.

Indicator means may be provided to indicate the liquid level in the liquid storage means. In one arrangement the indicator means is in the form of a generally transparent chamber such as a tubular member, extending vertically and located adjacent an inner wall of the container, the lower end of the transparent chamber communicating with a lower portion of the liquid storage means. The assembly may also include variable release means for releasing liquid from the reservoir means.

The upper container may be located adjacent the lower containers by any suitable locating/fixing means, preferably readily releasable. For example, the upper container may be provided with seating means adapted to sit on a portion of the lower inner plant container and/or a portion of the lower outer container. In one arrangement the upper container is provided with an upper peripheral trough housing adapted to house the growing medium and a lower and narrower peripheral trough forming liquid storage means, the upper container seating means being formed adjacent the external junction of the two peripheral troughs.

The invention is not only applicable to the conventional indoor plant arrangement of inner and outer plant containers. The invention could also be adapted to apply to a conventional single container housing a plant(s).

Thus in accordance with another aspect of the invention there is provided a plant container located adjacent the upper portion of a lower plant container, said container being provided with access means to provide access for a plant or plants extending from said lower plant container.

BRIEF DESCRIPTION OF DRAWINGS

In order that this invention may be more easily understood and put into practical effect, reference will now be made to the accompanying drawings which illustrate preferred examples of the invention, wherein.

DETAILED DESCRIPTION OF THE INVENTION

Figure 1:
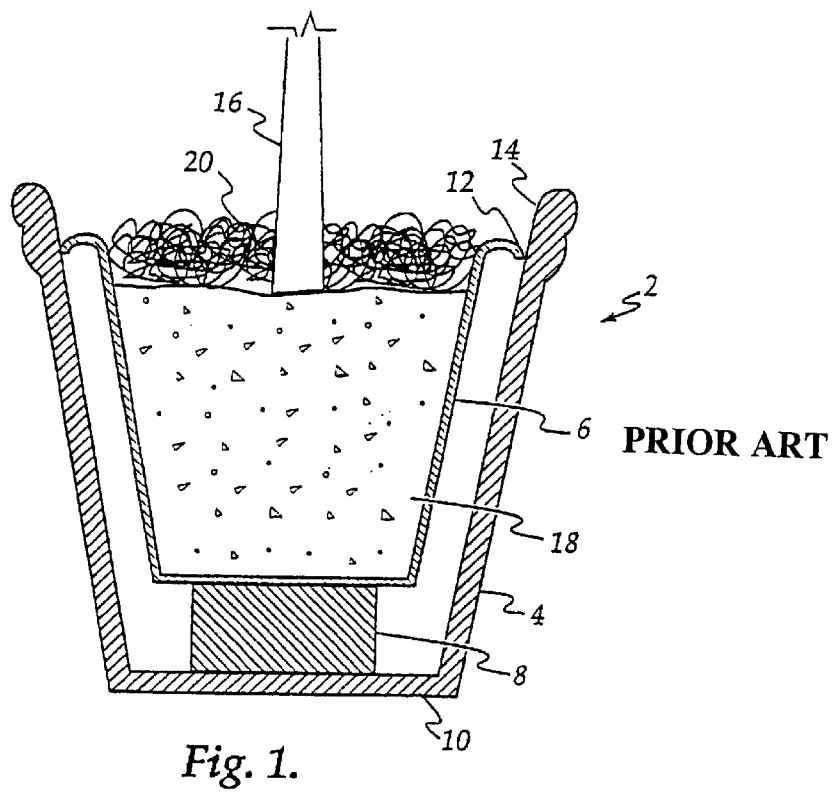
FIG. 1 is a sectional view of a prior art plant container assembly.

Referring first to FIG. 1, a prior art plant hire container assembly 2 includes an outer decorative container 4 which houses a smaller and inner plant container 6. A support stand 8 spaces the inner plant container 6 from the base 10 of the outer decorative container. An upper peripheral rim 12 of the inner plant container 6 fits within, and may be spaced form, the upper inner periphery 14 of the outer decorative container 4. The trunk 16 of a shrub extends from the plant container 6, and the immediate area above the plant medium 18 and extending to the periphery 14 of the outer container is covered with coconut fibre 20 to enhance the visual appearance of the plant container assembly.

Figure 2:
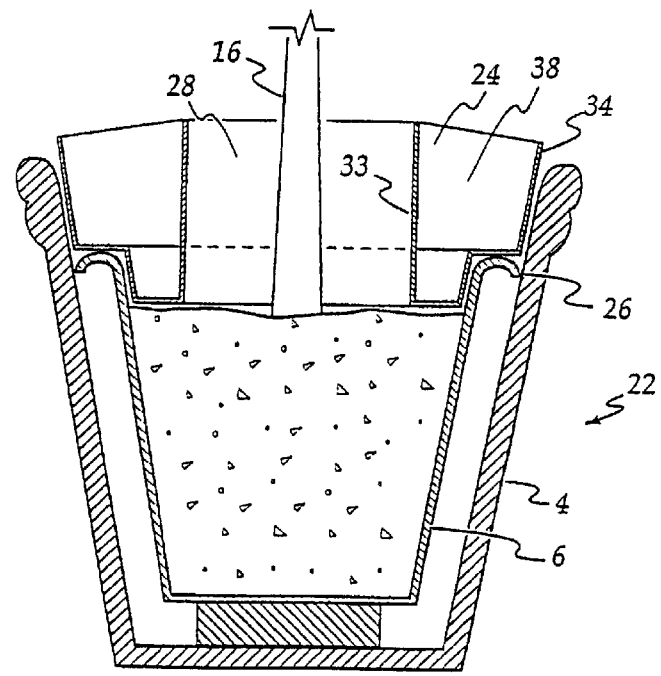
FIG. 2 is a sectional view of a container assembly constructed in accordance with the invention.

FIG. 2 illustrates a plant container assembly 22 constructed in accordance with the invention, in which the coconut fibre 20 of the prior art assembly of FIG. 1 is replaced by an upper plant container 24. The upper plant container sits on the upper peripheral rim 26 of the lower plant container 6 and a central opening 28 allows access of the trunk 16 extending upwardly from the shrub planted in the lower inner plant container 6. The upper periphery of the upper plant container 24 generally conforms to the upper peripheral shape of the outer decorative container 4 so that the lower inner plant container 6 is not normally visible to the observer.

Figure 3:
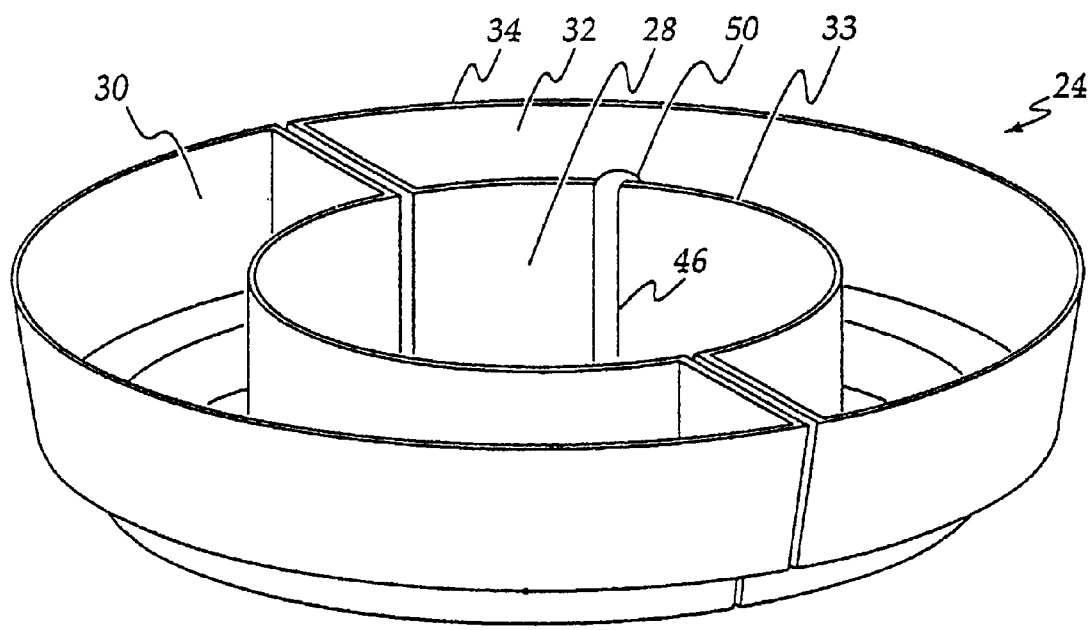
FIG. 3 is a perspective view of a circular upper container formed in two halves and constructed in accordance with the invention.
Figure 4:
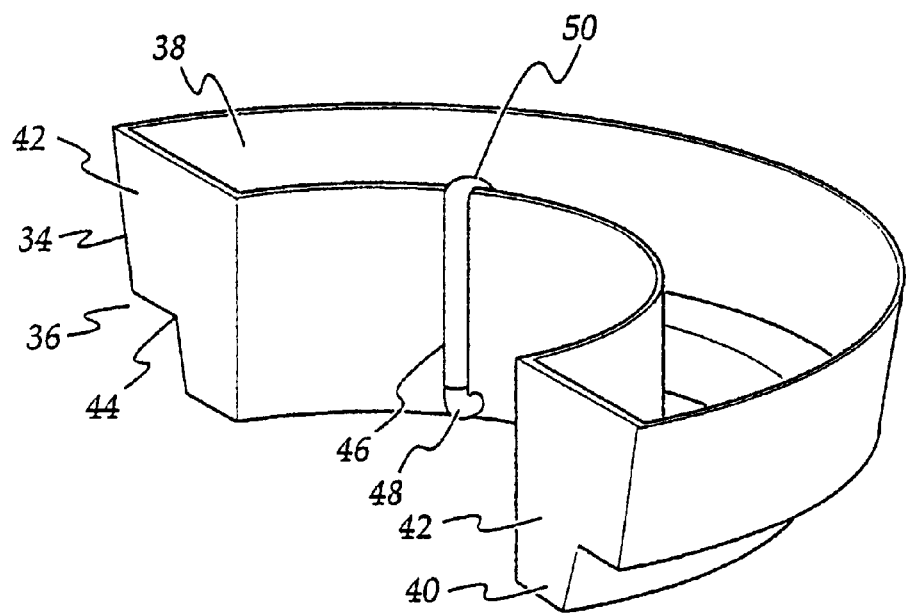
FIG. 4 is a perspective view of one of the half containers illustrated in FIG. 3.

As best seen in FIGS. 3 and 4 the upper container 24 is formed of two readily releasable substantially identical half containers 30 and 32. The two halves combine to define therebetween the central circular opening 28 adapted to permit access of the shrub trunk. The two halves also join together to form a ring shaped (in plan view) trough having inner 33 and outer 34 walls surrounding the central circular opening.

Referring to FIG. 4 the lower portion of the outer wall 34 of each half container is stepped inwardly at 36. This step provides a plant container portion in the form of an upper peripheral trough 38 for receiving plants/planting medium, and also provides a lower narrower and shallower trough 40 for receiving liquid and which acts as a water well for the plant roots. The upper and lower troughs are generally U shaped in cross-section and each half trough is closed at each end by end walls 42. The underside 44 of the upper trough 38 at the junction of the two troughs acts as a seating means for the upper plant container 24 to sit on the upper peripheral rim 26 (see FIG. 2) of the lower container.

As best seen in FIG. 2, the inner wall 33 of the container 24 optionally extends higher than the outer wall 34 of the container 24 to enhance the visual appearance of the container assembly 22 when in use.

As seen in FIG. 4 a visual water level indicator in the form of a transparent plastics tube 46 extends vertically and centrally of the inner wall 33 of the half containers 24. The lower end 48 of the transparent tube communicates with the water in the lower portion of the water well 40, and the upper open end 50 of the tube is attached to the container inner wall 33. The tube 46 could be provided with markers to indicate, for example, high and low water levels.

Figure 5:
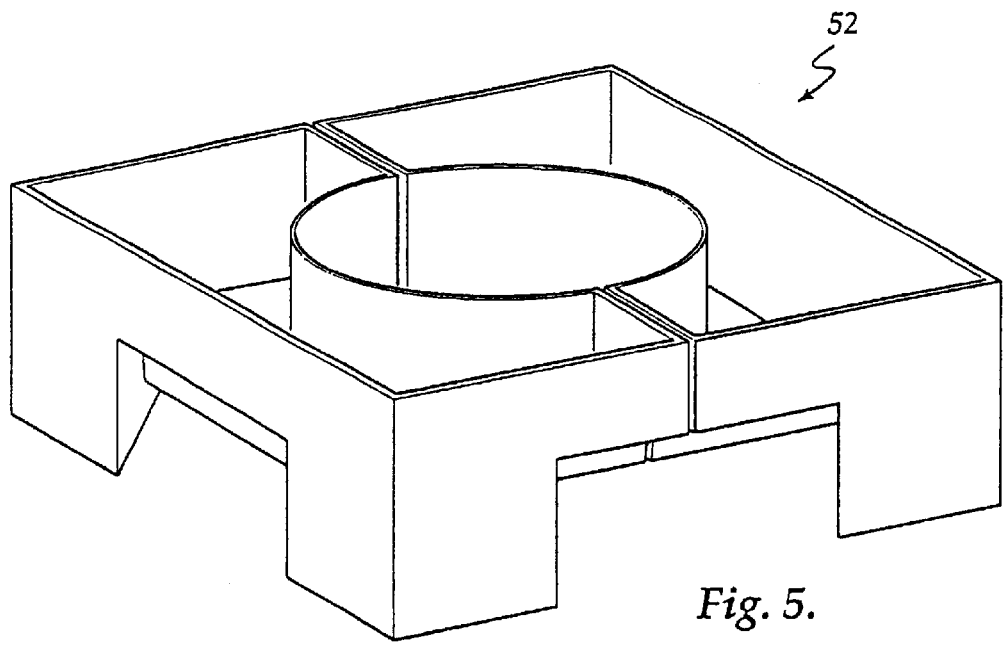
FIG. 5 is a sectional view of an alternative container assembly adapted for a box-shaped lower outer container.
Figure 6:
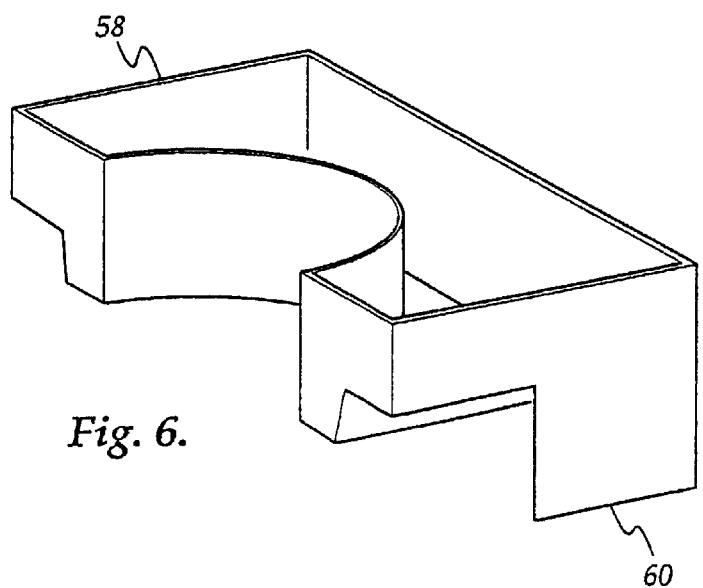
FIG. 6 is a perspective view of a half container utilised in the assembly of FIG. 6.
Figure 7:
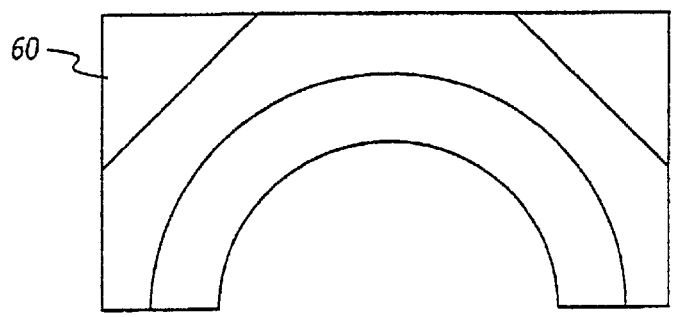
FIG. 7 is an underside view of the half container illustrated in FIG. 6.

FIGS. 5 to 7 illustrate an alternative plant container assembly in which the lower container 52 is box shaped. Thus the upper periphery 58 of the upper plant container generally conforms to the upper peripheral shape of the box-shaped lower container. The corner underside spaces of the upper container are utilized to provide water wells 60.

In use, and as best seen in FIG. 2, a first half section of the upper plant container 24 is placed in position around the shrub trunk 16. The second half section plant container is then placed in position.

When it is desired to water or check the need for watering the shrub in the lower container, access can be gained via the central opening 28. The water level in the half containers can be periodically checked by lifting and radially removing one of the half containers and viewing the water level indicator 46.

Figure 8:
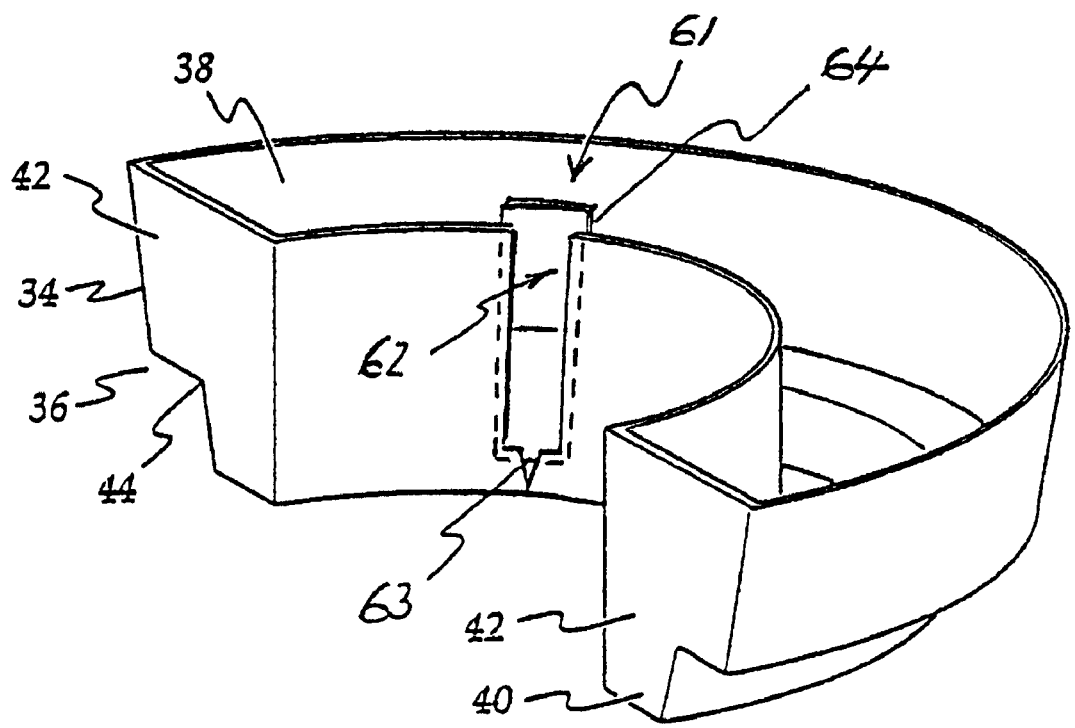
FIG. 8 illustrates an alternative water level indicator which acts as a water release mechanism.

As can be seen in FIG. 8, an alternative water level indicator 61 includes a cutout portion 62 in the inner wall which terminates in a triangulated tip 63. A clear plastic slider 64 is adapted to slide in supports (not shown) to closely abut the inner surface of the inner wall. When slider 64 is completely lowered, no water is released from the reservoir 40, when slider 64 is raised a small amount, a slow drip can exit through the tiny aperture thus formed at the tip 63. The size of the aperture (and thus the quantity of liquid exiting) increases as slider 64 is further raised. Thus it will be seen that this arrangement allows a variable release of fluid from the reservoir to ensure that plants planted therein do not become waterlogged.

It will of course be realised that whilst the above has been given by way of illustrative examples of the invention, all such and other modifications and variations hereto, as would be apparent to persons skilled in the art, are deemed to fall within the broad scope and ambit of this invention as is herein set forth.

The claims defining the invention are as follows:

1. A pot plant container assembly for simultaneously holding a main plant(s) and a minor plant(s) which conceals a planting medium in which the main plant grows, the assembly being positionable within an outer container, said assembly comprising:
   a lower container adapted to house the main plant(s) and a first planting medium; and
   upper container means adapted to house the minor plant(s) and a second planting medium and being positionable above said lower container adjacent to an upper inner portion of the outer container, the upper container means comprising:
      support means for supporting said upper container means on said lower container and/or on the upper portion of the outer container;
      an opening therethrough which provides access for at least one of a plant growth, stem, and trunk of the main plant(s) extending upwardly from the lower container; and
      reservoir means for containing water and/or nutrient for the minor plant(s) growing in said upper container means,
   whereby, in use, said upper container means substantially conceals said lower container and planting medium therein.

2. A pot plant container assembly as claimed in claim 1, wherein said upper container means includes a plurality of container segments adapted to cooperate to substantially cover the inner upper periphery of the outer container and to form the opening.

3. A pot plant container assembly as claimed in claim 1, said reservoir means defining with the base of said upper container means a shoulder constituting said support means, said shoulder being adapted to support the upper container means on an upper surface of the lower container.

4. A pot plant container assembly as claimed in claim 1, wherein the upper periphery of the upper container means generally conforms to the upper peripheral shape of the outer container so that the lower container is not normally visible to an observer.

5. A pot plant container assembly as claimed in claim 4, wherein the upper container means is releasably formed by two parts, each part having a plant container portion and the two parts combining to define therebetween an opening adapted to permit access of any plant growth extending upwardly from beneath the upper plant container.

6. A pot plant container assembly as claimed in claim 1, further comprising indicator means to indicate the liquid level in said reservoir means.

7. A pot plant container assembly as claimed in claim 1, further comprising variable release means for releasing liquid from said reservoir means.

8. A pot plant container assembly for simultaneously holding a main plant(s) and a minor plant(s), the assembly for holding a minor plant(s) and for substantially covering the periphery of an outer container housing at least one inner container for holding a main plant(s) and a planting medium, said assembly comprising:
   upper container means adapted to house the minor plant(s) and in use being located above the inner container(s) adjacent to an upper portion of the outer container, the upper container means comprising:
      support means for supporting said assembly on the inner container(s) and/or on the upper portion of the outer container; and
      an opening therethrough which provides access for at least one of a plant growth, stem, and trunk of the main plant(s) extending upwardly from the inner plant container(s).

9. A pot plant container assembly for simultaneously holding a main plant(s) and a minor plant(s) which conceals a planting medium in which the main plant grows, said assembly comprising:
   an outer container;
   said outer container housing at least one inner container;
   said inner container(s) being adapted to house the main plant(s) and a first planting medium; and
   an upper container adapted to house the minor plant(s) and a second planting medium and adapted to be located above said inner container(s) adjacent to an upper portion of the outer container;
   said upper container having an opening therethrough which provides access for at least one of a plant growth, stem, and trunk of the main plant(s) extending upwardly from the inner plant container(s).

10. A pot plant container assembly for simultaneously holding a main plant(s) and a minor plant(s) which conceals a planting medium in which the main plant grows, the assembly being positionable within an outer container, said assembly comprising:

a lower container adapted to house the main plant(s) and a first planting medium; and upper container means adapted to house the minor plant(s) and a second planting medium and being positionable above said lower container adjacent to an upper inner portion of the outer container, the upper container means comprising:

support means for supporting said upper container means on said lower container and/or on the upper portion of the outer container; and an opening therethrough which provides access for at least one of a plant growth, stem, and trunk of the main plant(s) extending upwardly from the lower container, whereby, in use, said upper container means substantially conceals said lower container and planting medium therein.

* * * * *